Dec. 15, 1970  F. MELENDEZ  3,546,814
ROBOT DRIVER OF A TWO-WHEEL MOTORCYCLE
Filed Feb. 24, 1969  3 Sheets-Sheet 2

INVENTOR
FEDERICO MELENDEZ
BY
Miner L. Hartmann
ATTORNEY

United States Patent Office 3,546,814
Patented Dec. 15, 1970

3,546,814
ROBOT DRIVER OF A TWO-WHEEL MOTORCYCLE
Federico Melendez, Via Archimede 37, Apt. 1,
Rome, Italy 00197
Filed Feb. 24, 1969, Ser. No. 801,527
Int. Cl. A63h 30/00
U.S. Cl. 46—244                                   5 Claims

ABSTRACT OF THE DISCLOSURE

A robot for a two-wheeled motorcycle is controlled by a remote operator through electronic control of a battery-powered motor, which can be started, rotated, and stopped on signal either clockwise or counter-clockwise. The control motor's rotation causes the shifting of a balancing weight and simultaneously steers the motorcycle to the right or left by actuating arm levers, following the shifting of the balancing weight. The robot and motorcycle leans in the direction of the turning, and by remote control manipulation by an operator, the moving two-wheeled motorcycle may be maintained in equilibrium in the selected direction of movement.

BACKGROUND OF THE INVENTION

This invention relates to a radio-controlled robot for a two-wheeled motorcycle which maintains the equilibrium of said robot on the motorcycle when it operates on straight runs and turns, and when traveling over smooth or uneven ground. The method utilized by this robot in maintaining this equilibrium consists, as in the case of an animate motorcyclist, in its exertion of lateral force to the motorcycle at the proper times. In more precise terms, this robot's operating system permits it to lean with its own weight to either side, independently of the tilt effect or tangential forces, in a manner which corresponds to the actions of an animate counterpart who must lean to either side at the proper times if he is to maintain the motorcycle he drives in equilibrium on its two wheels.

The motorcycle herein mentioned is a toy or scale model, for example, of one-fourth scale of an average commercial motorcycle, which is propelled by a motor, which may be an internal combustion engine or a battery operated motor. The model may have a weight approximately proportionate to its size, in relation to a commercial motorcycle, and will have a correspondingly low center of gravity.

DESCRIPTION OF THE PREFERRED EMBODIMENT

Figure 1:
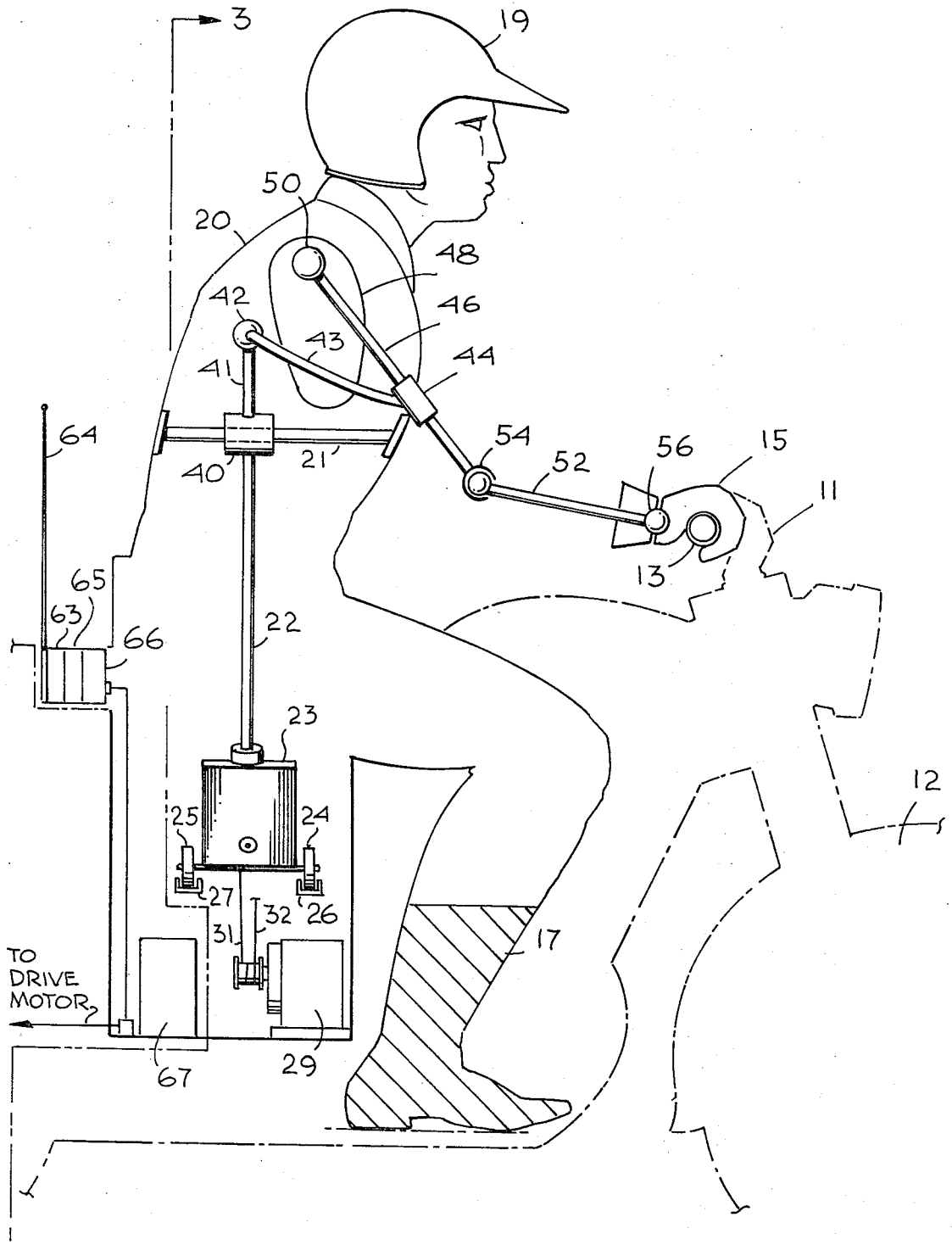
FIG. 1 is a side elevational view of the mounted robot, details of the motorcycle, and the coverings of the robot's arms being omitted for clarity.

It will be understood that the robot must be placed on the motorcycle by the robot operator who will properly attach the hands, feet, and body for performing the functions of turning and continuously stabilizing the two-wheeled vehicle after the driving motor and the driving gear have been put into operation by said operator.

When the robot is actuated by radio control, it performs two basic functions: (1) moves its arms to turn the motorcycle's handlebars to the right or left, and (2) leans with its weight to either side, which it does by movement of its weight-shift block (which will be described below). These two actions—turning the handlebars and leaning—are performed simultaneously by the robot. The robot leans in the same direction as the turn, that is, right or left.

While the word "robot" is used herein in its usual meaning of a machine-made man, it may take other forms such as an animal or merely a box-like container or the fully exposed mechanical elements of the robot.

In the preferred embodiment as shown in the drawings, the robot is shown in the generalized form of a human body as a hollow covering over supporting structural frame parts on which the mechanical operating members are mounted.

The motorcycle is of conventional form with a rear wheel and drive motor therefor (not shown in the drawings) and a rotatable front wheel 12 mounted for turning (for steering), on a frame 11 by means of a right handlebar 13 and a left handlebar 14. The robot's arm coverings may consist of hollow molded plastic upper and lower parts operatively pivoted together and to the torso for conventional movements, these parts not being shown in the drawings. The robot's gloved hands 15 and 16 are operatively connected respectively to the right 13 and left 14 handlebars. The booted legs and feet 17 and 18 of the robot are preferably weighted (to keep the center of gravity low), and rest on the motorcycle frame 11 in the conventional position. The robot head 19 and the body 20 are simulations of a human form. Inside the body 20 is a horizontal fixed chest-to-back bar 21 upon which is mounted for pendulum-like movement a weight-shift rod 22 supporting the weight-shift block 23. The weight-shift block 23 is guided in its pendulum-like movement at right angles to the vertical central plane of the mounted robot and motorcycle, by two small wheels 24 and 25 which travel in arcuate channel tracks 26 and 27.

The weight-shift rod 22 swings on the chest-to-back bar 21, preferably being provided with a low friction bearing 40, and an extension 41 of the rod 22 beyond the bearing point, relatively short in length, is pivoted by a ball and socket joint 42 to the curved arm-actuating rod 43, whose outer ends, right and left, are provided with slide bearings 44 and 45 respectively. These slide bearings 44 and 45 slidably engage the upper arm rods 46 and 47 by ball and socket joints 54 and 55 respectively; and the lower end of the forearms 52 and 53 are connected respectively to the gloved hands 15 and 16 by ball and socket joints 56 and 57. The rod 43 is preferably curved to facilitate the movement of the slide bearings 44 and 45 on the upper arm rods 46 and 47, and the friction at the shoulder sockets.

Figure 2:
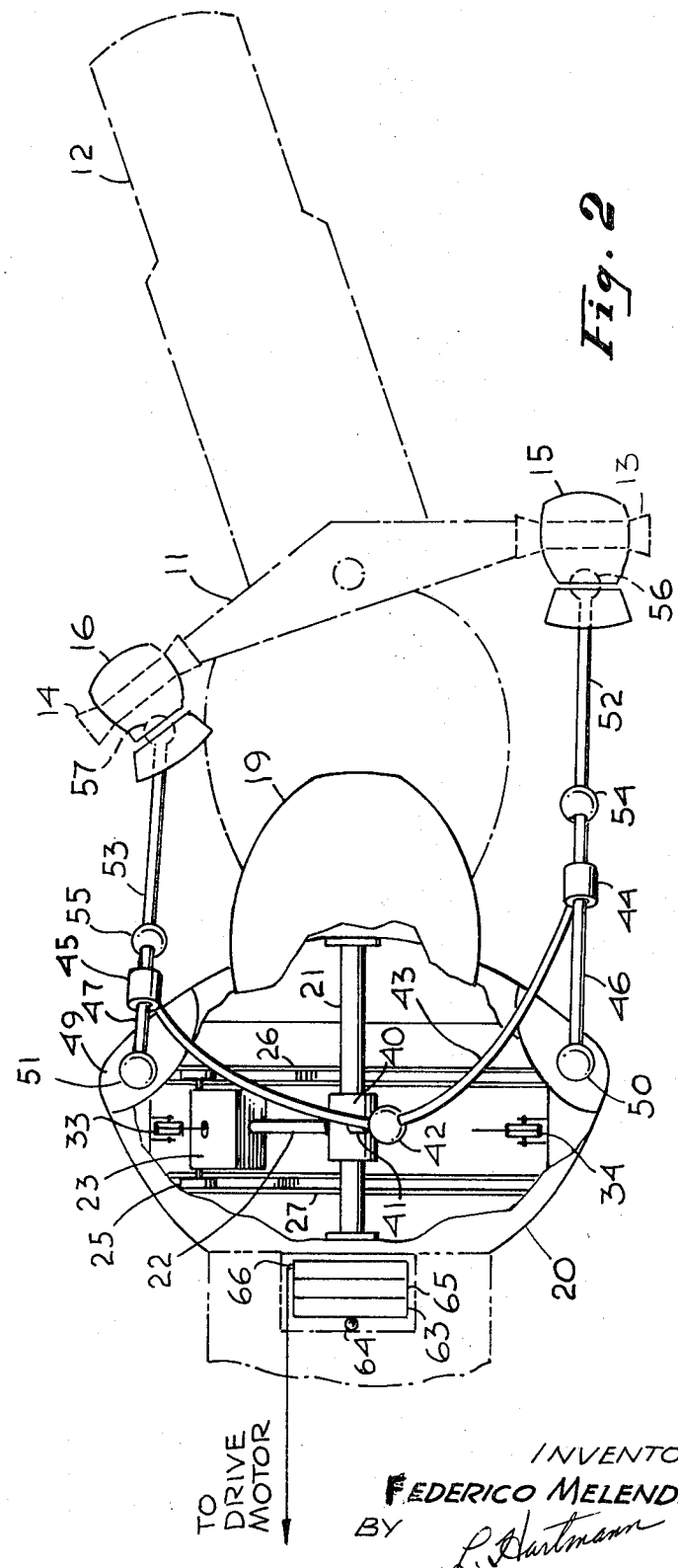
FIG. 2 is a plan view of the same in a left turn position, with portions of the robot's body broken away for clarity.
Figure 3:
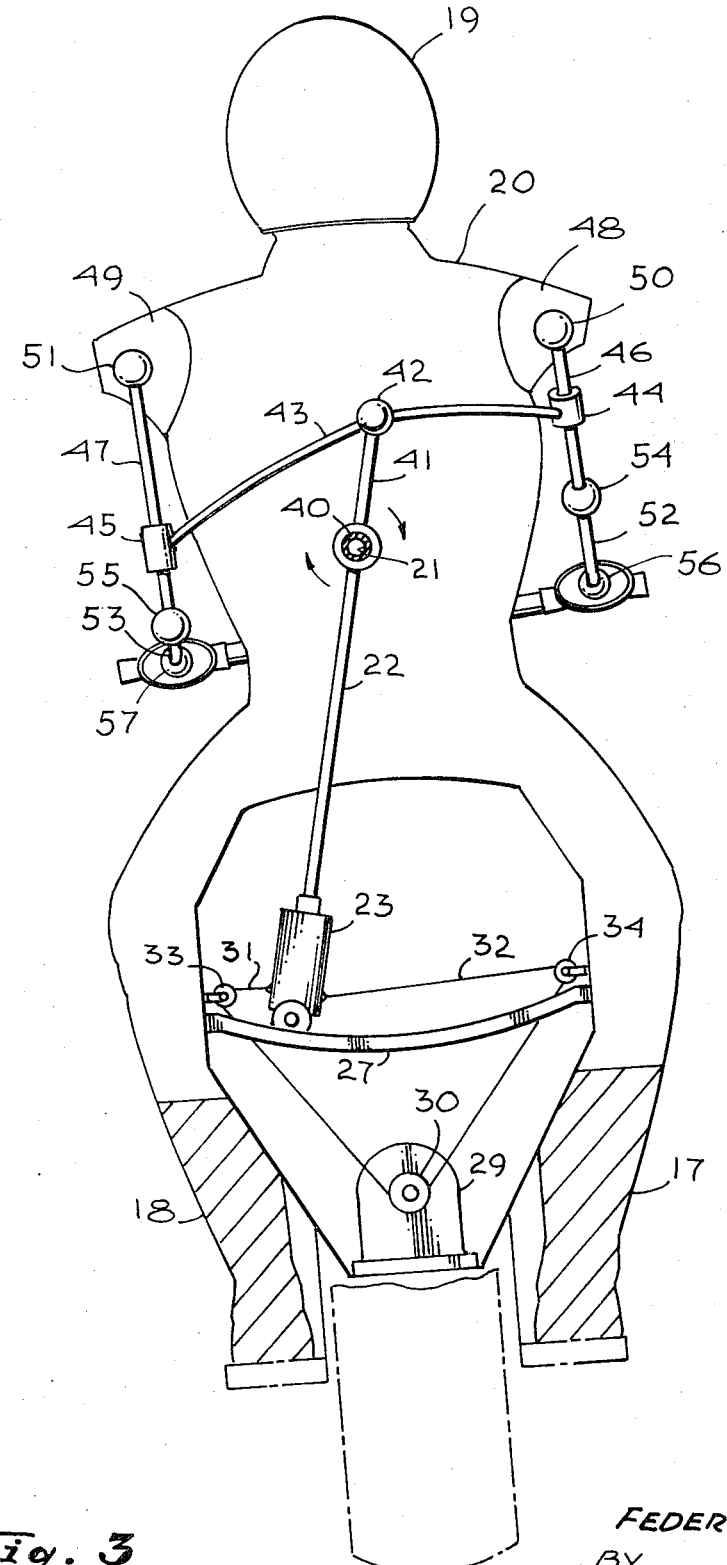
FIG. 3 is a rear elevational view of the same, in a left turn position, with parts of the motorcycle and coverings of the arms of the robot being omitted for clarity.

The robot's arm action to turn the handlebars, and thus direct the motorcycle to the right or left, to straighten out from a turn or to maintain a straight run or turn, is controlled directly by the lateral swing movement of the robot's weight-shift rod 22 and its extension 41, acting through the curved arm-actuating rod 43. When the weight-shift rod 22 is swinging toward the left (as in FIGS. 2 and 3) the robot's left arm is being drawn in, while at the same time its right arm will be extending itself or moving forward, thereby causing the handlebars 13 and 14 to move to veer left. Conversely, when the weight-shift rod is swinging laterally toward the right, the robot's right arm will be foreshortening itself while its left arm will simultaneously be moving toward its extended position, thus causing the motorcycle to veer right or straighten out of a left turn.

The lateral swing movement, left or right, of the weight-shift rod 22 and its attached weight-shift block 23, is controlled by the robot's control motor 29. The weight-shift block 23 is connected to a winding rod 30, by two cords or bands 31 and 32, whose one ends are attached to the winding drum 30, wind and unwind on said drum; and whose other ends are attached to the weight-shift block 23, passing over intermediate pulleys 33 and 34 affixed adjacent the right and left ends respectively of the tracks 26 and 27. When the electric control motor is running clockwise, one end band 31 starts winding itself around the winding drum 30, and the other end of this band pulls on the weight-shift block 23 to which it is attached. Simultaneously, one end of band 32 starts unwinding itself from the winding drum 30, and its other end eases the stress on the weight-shift block to which it is also attached; and vice versa when the electric motor is running counter-clockwise. In this manner, a motor-controlled movement of the weight-shift block 23 is achieved.

Each time the weight-shift block 23 rolls off dead center, laterally to the right or left, the weight of the robot will be shifting to one side—toward the side of turning or veering of the motorcycle. In other words, when the robot makes the motorcycle veer to the right or left, the robot leans with its weight in the direction of veering, independently of any tilt effect or tangential pull. In doing so, the robot exerts lateral tensions to the motorcycle (as does an animate motor cyclist) thereby furnishing a complement to the tangential force, which is essential for the maintaining of equilibrium on two wheels. For in this way the robot (as in the case of the animate motorcyclist) is able to cancel out the extraneous and adverse equilibrium factors—those produced by unevenness of the ground and by the wind. As it is known, these adverse factors or pulls can cause a motorcycle to tilt too much and fall to a side, unless of course their effect is counteracted by the motorcyclist leaning with his body and veering his motorcycle against an adverse pull. This leaning and turning action can also be performed by the robot: that is, it can be directed to do so by remote control when the person controlling the robot sees that the motorcycle is tilting too much, he directs the robot to lean and veer the motorcycle in the opposite direction.

The center of gravity of the motorcycle and the robot is lower than that of an animate rider, and may be adjusted, in manufacture, by the actual weights used in the feet and lower part of the legs of the robot.

Figure 4:
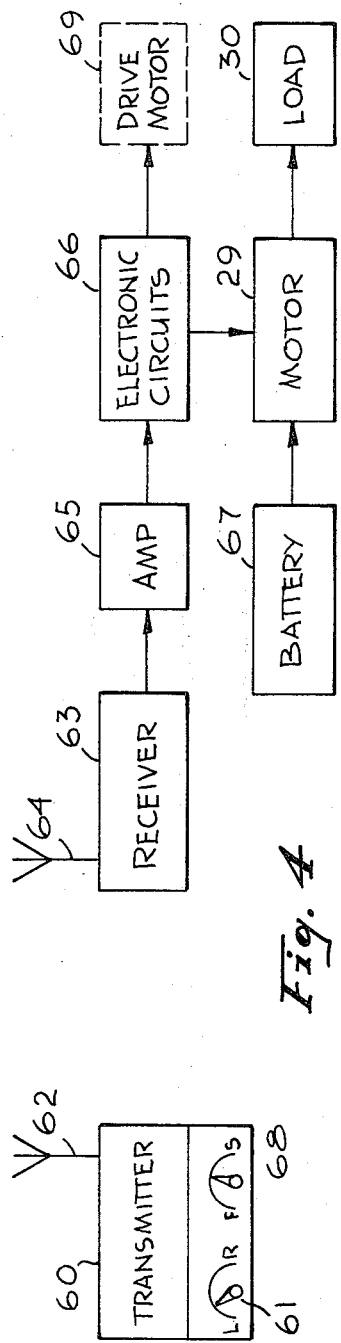
FIG. 4 is a diagrammatic representation of a conventional electronic signaling and motor control system for said system.

The remote control means above referred to is of a conventional type shown diagrammatically in FIG. 4. When the operator turns a dial 61 on the transmitter 60 to right (for example), an electric signal is beamed from an antenna 62 to an antenna 64 and thence to a receiver 63 attached to the robot. The signal is automatically amplified at 65, and by means of electronic switching circuits 66 the motor 29 is set into operation to run clockwise, using the energy of the battery 67; and vice versa when the transmitter dial is turned to the left. The speed of the drive motor is similarly controlled by the dial 68.

The robot-mounted motorcycle is thus controlled to keep it in stabilized motion.

I claim:
1. In combination a two wheeled motorcycle and a robot for maintaining the equilibrium of said motorcycle, said robot comprising:
   a rod-suspended weighted pendulum mounted on or within said robot and positioned to swing laterally of said motorcycle;
   control motor means including actuating power means therefor associated with said robot, for moving said pendulum either to the right or to the left;
   lever means actuated simultaneously by said pendulum in its lateral movement which move the robot's actuating arms forwardly and backwardly to steer said motorcycle; and
   electronic control means associated with said robot for the operation of said control motor, responsive to remote radio signals.

2. The combination defined in claim 1 in which said weighted pendulum is moved to the right or left by two cords or bands attached thereto, each of said cords being either wound or unwound on or from a winding drum actuated by said motor.

3. The combination defined in claim 1 in which wheels are attached to said weighted pendulum, and fixed arcuate track means are provided which said wheels follow, whereby to maintain the lateral movement of said pendulum in a plane at right angles to the central longitudinal vertical plane of said robot.

4. The combination defined in claim 1 in which said lever means for moving the robot's arms forwardly and backwardly to steer the motorcycle includes an extension of the suspension rod of said pendulum beyond the axis of swinging, said extension laterally moving a curved arm actuating-rod operatively connected at its outer ends with two arm levers each pivoted at a shoulder position on said robot.

5. The combination defined in claim 1, in which the electronic control means comprises a receiver for radio signals originating from a remote transmitter, an automatic amplifier of said received radio signals, and a system of electronic circuits for using said amplified radio signals to actuate the operation of said control motor whereby to start its rotation in either direction and to stop rotation.

References Cited
UNITED STATES PATENTS 2,814,908  12/1957  Ernst _____ 46—107

FOREIGN PATENTS 1,015,694  10/1952  France _____ 46—106

LOUIS G. MANCENE, Primary Examiner

D. L. WEINHOLD, Jr., Assistant Examiner

U.S. Cl. X.R.

46—101